United States Patent [19]
Rush et al.

[11] Patent Number: 5,425,307
[45] Date of Patent: Jun. 20, 1995

[54] DICING MACHINE

[75] Inventors: Dennis Z. Rush, Warrenton; Paul S. Anderson, Astoria, both of Oreg.

[73] Assignee: Carruthers Equipment Co., Warrenton, Oreg.

[21] Appl. No.: 201,898

[22] Filed: Feb. 25, 1994

Related U.S. Application Data

[63] Continuation-in-part of Ser. No. 63,402, May 17, 1993.

[51] Int. Cl.⁶ .............................................. B26D 3/18
[52] U.S. Cl. ................................. 99/357; 83/404.1; 83/408
[58] Field of Search .................... 99/357; 83/408, 318, 83/404.1, 932

[56] References Cited

U.S. PATENT DOCUMENTS

| | | | |
|---|---|---|---|
| 2,130,937 | 9/1938 | Urschel | 83/408 X |
| 2,541,180 | 2/1951 | Urschel et al. | 83/403 X |
| 2,605,841 | 8/1952 | Overman | 83/318 |
| 3,010,497 | 11/1961 | Pease | 83/408 X |
| 3,327,751 | 6/1967 | Lamb | 83/408 X |
| 3,990,336 | 11/1976 | Soodalter | 83/408 X |
| 4,163,406 | 8/1979 | Crawford | 83/424 |
| 4,205,570 | 6/1980 | Soodalter | 83/408 X |
| 4,329,900 | 5/1982 | Dennis et al. | 83/355 |
| 4,782,729 | 11/1988 | Mathot | 83/408 |
| 4,796,821 | 1/1989 | Pao et al. | 83/734 X |
| 5,158,010 | 10/1992 | Rosenberger | 99/537 X |
| 5,315,907 | 5/1994 | Biagiotti | 83/318 X |

*Primary Examiner*—David A. Scherbel
*Assistant Examiner*—Patrick F. Brinson
*Attorney, Agent, or Firm*—Robert L. Harrington

[57] ABSTRACT

A three dimensional slicing/dicing machine that slices a food product such as a loaf of sausage into similarly sized but irregularly shaped cube like portions. The machine has cutting knives that have a sinusoidal like wavy profile at their cutting edge and has an inclined conveyor for conveying the food product loaf and the resulting sliced portions along a feed path. A first knife cuts a slice of determined thickness off the loaf. The slice tips over onto one of its sides onto the conveyor where it is transported to the second knife. The second knife, which is mounted at an angle to the first knife and the travel path of the conveyor cuts the slices into strips. A third knife which is mounted at an angle to the travel path opposite the angle of the second knife cuts the strips into the desired cube like formations. The second and third knife are commonly mounted and are arranged to produce a flying type cutoff to prevent the knives from altering the position of the slices and strips as they are conveyed on the conveyor.

5 Claims, 5 Drawing Sheets

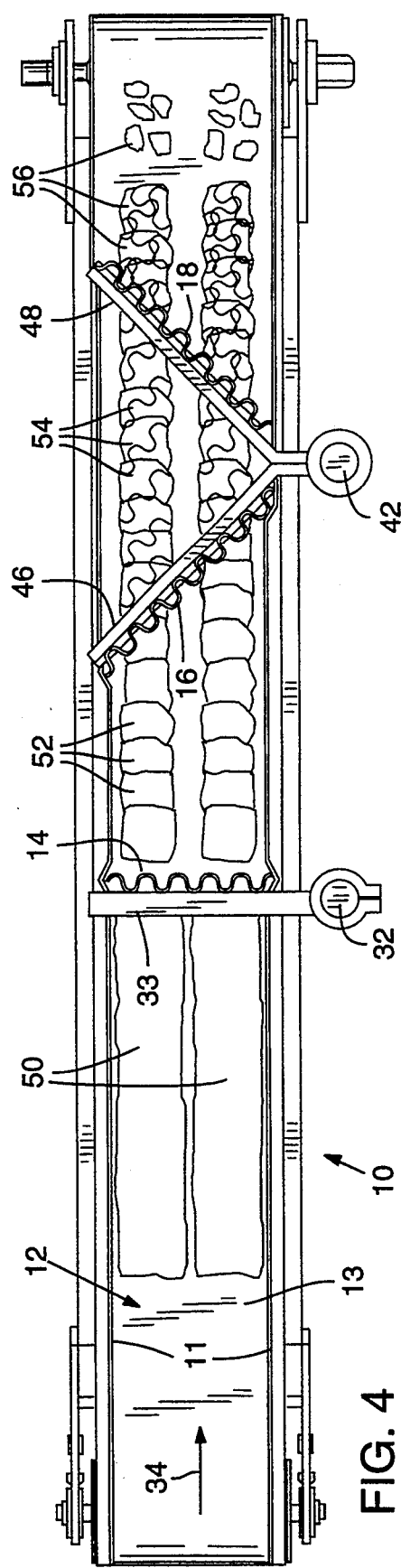
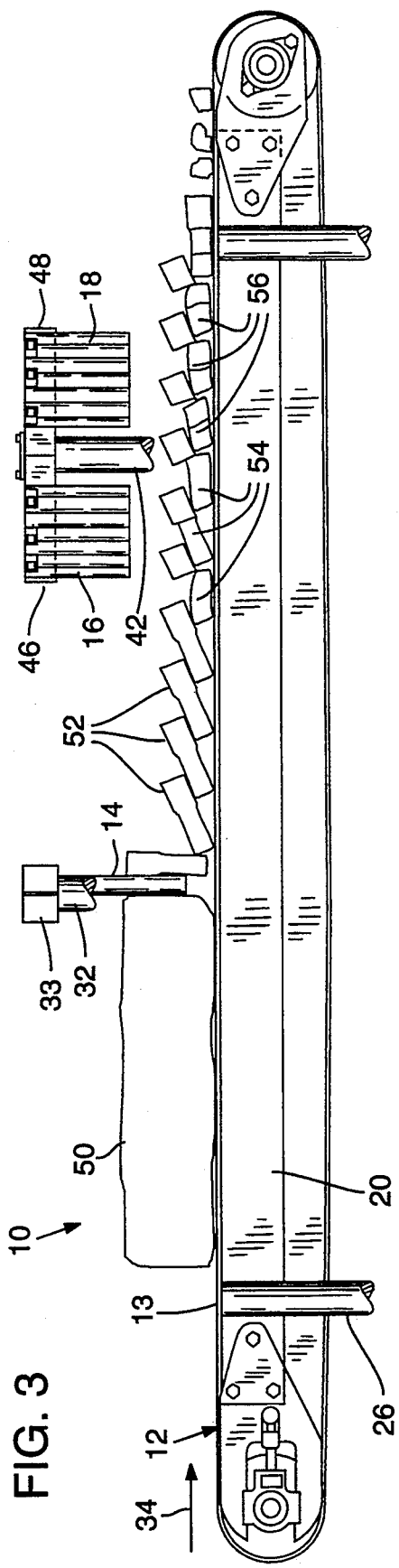
FIG. 4
FIG. 3

DICING MACHINE

This application is a continuation-in-part of the application titled THREE DIMENSIONAL AUTOMATIC FOOD SLICER, Ser. No. 08/063,402, filed May 17, 1993.

FIELD OF THE INVENTION

This invention relates to machines and processes for automatically dicing large quantities of food product, and more particularly to a dicing machine that produces small portions of a food product that are similarly sized but appear to be irregularly cut as if cut by hand.

BACKGROUND OF THE INVENTION

Certain food items are considered the province of specialty restaurants. There are many examples of such food items but the one that will be considered for explanation of the present invention is pizza. Pizza is often thought of in the context of small community restaurants wherein the pizza of that restaurant has a distinguishing characteristic that sets it apart from other pizza restaurants. It is desirable to maintain this kind of individualism even for restaurant chains. Of course, the food product should be consistent as among the restaurants of the chain but each restaurant should convey the impression that its pizza is specially produced.

To insure consistency among the restaurants, they will have similar menus, the ingredients will be provided from a common source, and preparation of the food item will follow a prescribed cooking formula. Nevertheless, each restaurant can be provided with a community-like atmosphere. This leaves the food item itself. The pizza should not look like it has been made by a machine with everything having a symmetrical appearance.

Pizzas are identified primarily by their toppings. A common topping is sausage. A hand made sausage pizza will have chunks of sausage spread over the top of the pizza. Perfectly formed cubes of sausage or perfectly formed configurations of any kind give the appearance of automation and is to be avoided. Yet consistency of food product dictates that so many chunks of a certain size chunk are to be used for that pizza. Thus, the chunks are pre-made at a central source. They can readily be produced of equal size but to provide the desired appearance of dissimilarity is not so easily achieved.

It is an object of the present invention to provide a machine that will cut a food product, e.g., sausage rolls or loaves, into equally sized chunks that are dissimilar and thus maintain the desired custom look of home style cooking.

BRIEF SUMMARY OF THE INVENTION

The present invention provides a machine that cuts a roll or loaf of the food product sequentially into slices, strips, and cubes, but does so in a manner that a repeating pattern of cuts is not perceivable from the end product. In the preferred embodiment, a conveyor conveys the loaf lengthwise along a conveyor. Three separate blades are used and each slices through the food product in a vertical motion. Each blade is corrugated, however, a combination of blades can be selected with corrugated or straight cutting edges. The first blade is substantially normal to the direction of conveyance and cuts the loaf into slices, the front and back side being corrugated. The slices are tipped over and passed under the second blade in a laid-over orientation. The second blade is angled 45 degrees from the direction of conveyance and cuts the slices into corrugated strips that are laid on the conveyor at a 45 degree angle. The third blade is also angled 45 degrees from the direction of conveyance but in the opposite direction of the second blade. That is, it is 90 degrees offset from the strips that pass under it. The strips are thus cut into irregular cubes.

The irregular cubes are formed from three curved blade sections. However, the section of the curve that cuts any particular face of any particular cube varies greatly from cube to cube and the different patterns of cubes produced are innumerable. There is no symmetry and a close inspection of the end product discerns only irregularity.

The advantages of the invention will be more fully appreciated upon reference to the detailed description and drawings referred to therein.

BRIEF DESCRIPTION OF THE DRAWINGS

FIG. 3 is a diagrammatical view of the three dimensional slicing/dicing machine;

FIG. 4 is a diagrammatical top view of the three dimensional slicing/dicing machine;

DESCRIPTION OF THE PREFERRED EMBODIMENT

Figure 1:
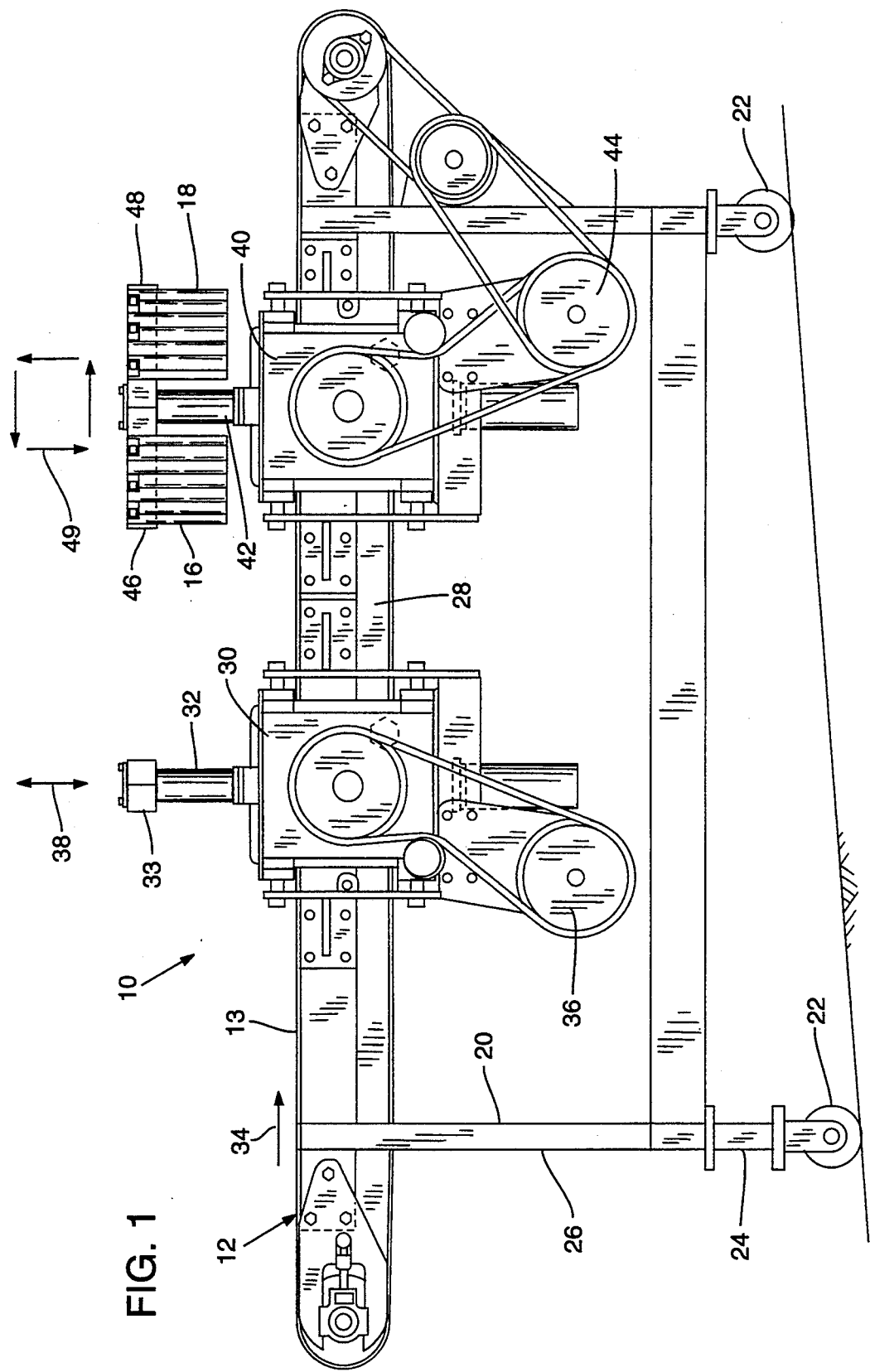
FIG. 1 is a view of the three dimensional slicing/dicing machine of the present invention.
Figure 2:
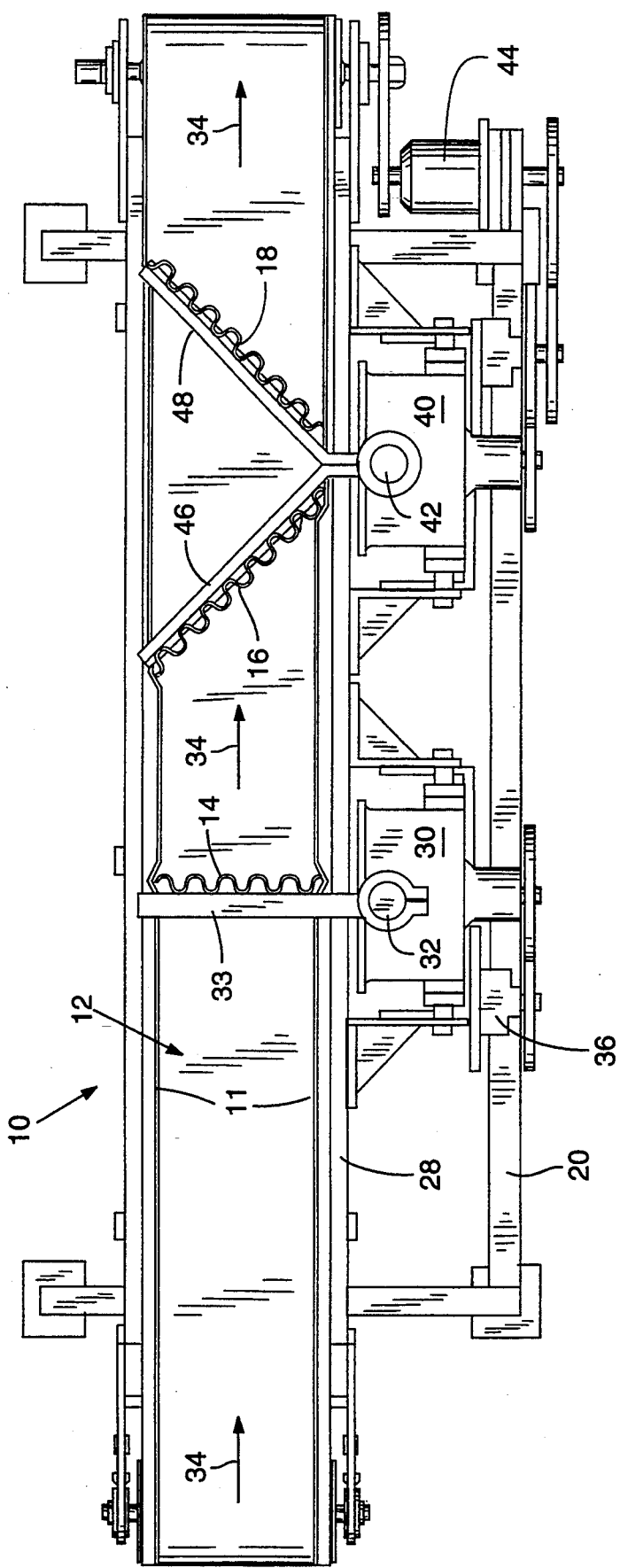
FIG. 2 is a top view of the three dimensional slicing/dicing machine of FIG. 1.

Refer now to FIGS. 1 and 2 of the drawings which illustrate a three dimensional slicing/dicing machine 10 for producing similar sized but irregularly shaped cube like portions from a food product item such as a log or loaf of sausage. The machine 10 has a conveyor 12 for conveying a food product item to be sliced, a first slicing blade or knife 14 (best seen in FIG. 2) for cutting the food product item into slices, a second slicing blade or knife 16 for cutting the slices into strips and a third slicing blade or knife 18 for cutting the strips into cubes.

A frame 20 supports the conveyor 12, the mechanism for the knife 14, the mechanism for the knives 16, and 18 with the components being mounted strategic one to the other. Only the components of the machine necessary for an understanding of the invention are illustrated. The side rails 11 of the conveyor 12 are shown only in FIGS. 2 and 4 to define sides between which the food product is maintained as it is being conveyed by the conveyor 12.

The frame 20 is preferably mounted on casters 22 for mobility and is arranged for mounting spacers 24 to be installed in end legs 26 to facilitate tilting the machine 10. The frame 20 is also preferably of the cantilever type to facilitate the removable mounting of a belt 13 on the conveyor 12. Although referred to as a separate item, the conveyor 12 is an integral part of the frame 20, particularly the frame 28 of the conveyor 12. Mounted to the frame 20 strategic to the conveyor 12 is a drive assembly 30 for the knife 14. The drive assembly 30 includes a reciprocating shaft 32 and arm 33 on which the knife 14 is mounted. The drive assembly 30 is of a type well known in the industry and further detail will not be provided. The drive assembly 30 is driven by a drive motor 36. The drive assembly 30 basically reciprocally moves the shaft 32 and arm 33 on which the knife 14 is mounted upwardly away from the conveyor 12 and downwardly toward the conveyor 12. The knife 14 is mounted on the arm 33 of the shaft 32.

As seen in FIG. 2 knife 14 extends across the width of the conveyor 12 with the knife 14 being mounted normal to the travel direction of the belt 13 of the conveyor 12. The travel path of the belt 13 of the conveyor 12 is indicated by directional arrow 34. The knife 14 is thus reciprocally movable toward and away from the surface of the belt 13 of the conveyor 12 as indicated by directional arrow 38 in FIG. 1. Another reciprocating drive assembly 40 is provided on the frame 20 for the knives 16, 18 at a distance downstream from the drive assembly 30 for the knife 14. As seen in FIGS. 1 and 2 the knives 16, 18 are mounted on arms 46, 48 of the reciprocating shaft 42. Again the knives 16, 18 extend across the width of the conveyor 12 and extend upward from the conveyor 12. Note however that the knives 16, 18 are mounted at an angle of about forty five degrees to the travel direction of the belt 13 and that the included angle between the knives 16, 18 is about ninety degrees.

The drive assembly 40 not only reciprocates the knives 16, 18 toward and away from the conveyor 12 but also moves the knives 16, 18 longitudinally in time with the motion of the belt 13 to provide what is commonly referred to as a flying cut-off. The knives 16, 18 as they descend toward the belt 13 are moved in the travel direction of the belt (as indicated by arrow 34) at the same rate (speed) of travel as the belt 13. The knives 16, 18 as they descend to slice an item on the belt 13 will not alter the position of the item on the belt 13. At the end of the cut, the knives 16, 18 are retracted and are moved rapidly in the direction opposite arrow 34 to properly position the knives 16, 18 for the next cut. The conveyor 12 and the drive mechanism 40 are driven by the same drive motor 44 to facilitate timing the movement of the knives 16, 18 to the movement of the belt 13 of the conveyor 12. The motion of the knives 16, 18 are generally indicated by the arrow set 49. The arrow set 49 is not provided as a true indication of the motion but is provided to indicate that the knives 16, 18 have motion toward and away from the belt 13 of the conveyor 12 and motion in the same direction as the travel direction of the belt 13 and counter to the direction of travel of the belt 13.

The knives 14, 16 and 18 (best seen in FIGS. 2 and 4) have cutting edges that are of a sinusoidal type wave form. The cutting edges thus will not produce a straight cut in a product but will produce a cut that has a wave form. This is beneficial in providing and end product that does not have the commercial cut-to-size appearance. The wave form for the knives (blades) 14, 16 and 18 have been exaggerated in the drawings for clarity. It will be appreciated that the wave form may be altered in size and shape to suit the size of the product being sliced and to provide the desired appearance of the end product (cube like portions).

Refer now to FIGS. 3 and 4 of the drawings which diagrammatically illustrate the cutting action of the three dimensional slicing machine 10. A log or loaf 50, or multiples thereof are placed or received on the belt 13 of the conveyor 12 as shown in FIGS. 3 and 4. For purposes of discussion, two loaves 50 and the resulting sliced portions will be referenced. The belt 13 of the conveyor 12 is driven at a selected rate in the direction as indicated by arrow 34 to move the loaves 50 along a feed path to be sliced by the knives 14, 16, and 18.

The reciprocal movement of the knife 14 and the reciprocal movement and the longitudinal movement of the knives 16, 18 are timed to the rate of movement of the belt 13 of the conveyor 12. The knives 16, 18 and the conveyor 12 are driven by the same drive motor 44 and the drive mechanism 40 that controls the movement of the knives 16, 18 is coordinated to provide the necessary movement of the knives 16, 18 in relation to the movement of the belt 13. Similarly the knife 14 is coordinated by the drive mechanism 30 to provide the correct cyclical movement of the knife 14 in relation to the movement of the belt 13 to provide a desired cutting width.

The conveyor 12 transports the loaves 50 downstream into the travel path of the knife 14. The knife 14 is timed to the rate of travel of the belt 13 to provide a desired width of slice that will be cut from the loaves 50. As the knife 14 descends into the loaf to cut a slice off the loaves 50, the knife will stop the movement of the loaves 50 along the belt 13 of the conveyor 12. The uncut portion of the loaves 50 will be in abutment with the side of the knife 14 and the loaf will be sliding on the belt 13 as the belt continues its rate of movement. The knife 14 descends down through the loaves 50 to the belt 13 to cut a slice of a determined width off the loaves 50. The slice cut from the loaves 50 will be referred to as a slice 52. The slice 52 as it is severed from the loaves 50 will tip over onto its side due to the inclination of the conveyor 12 in combination with the force of gravity. The sinusoidal pattern of the knife 14 will as the knife 14 cuts through the loaves 50 produce a wavy pattern on the faces (sides) of the slice 52. The knife 14 is retracted upward to clear the loaves 50 and once again the loaves 50 will be transported by the belt 13. When the loaves 50 has moved a distance downstream corresponding to the desired width of the slice 52, the knife 14 descends to cut another slice off the loaves 50. As the second slice 52 is being cut from the loaves 50, the first slice 52 is being transported by the belt 13. The second slice 52 as it is severed from the loaves 50 will tip onto its side and fall upon the first slice 52 to provide a "shingling" effect as illustrated in FIG. 3. It will be appreciated that the cycle of the knife 14 may be varied to control the amount one slice 52 overlaps a preceding slice 52 and that the cycle may be altered to place the slices 52 in an end to end arrangement.

The slices 52 are transported downstream by the belt 13 to the knives 16, 18 with the knife 16 producing the first cut in the slices 52. Knives 16, 18 as previously mentioned have a motion that produces a flying type cutoff. The knives 16, 18 as they descend to make their cut are also traveling at the same longitudinal rate as the belt 13, that is, they are also moving in the direction indicated by arrow 34 at the same rate as the belt 13. As the blades 16, 18 descend they will therefore not disturb the position of the portions on the belt 13. Knife 16 as it descends will cut the slices 52 into strips 54 (see FIG. 4) with the knife 16 generating a wavy pattern on each side of the strips 54. The strips 54 will thus have a wavy pattern on four of its sides, two wavy sides being formed by the action of knife 14 and two wavy sides formed by the action of knife 16. The belt 13 continues to transport the slices 52 and the strips 54 downstream in the direction indicated by the arrow 34. Knife 18, as it descends will produce a cut that is substantially at right angles to the cut produced by knife 16 and will cut the strips 54 into cube like portions referred to as cubes 56. The cubes 56 are all of similar size but vary in their appearance due to the wavy cuts produced by each of the knives 14, 16, and 18.

The cubes 56 produced by the cutting action of the knives 14, 16, and 18 have a wavy pattern on each of their sides, the wavy pattern being generated by the cutting action of the knives 14, 16, and 18. Each knife generates a wavy pattern on two sides of the cube 56. The arrangement of the knives 14, 16, and 18 produce cubes 56 that are similar in size yet each side of the cube will vary from cube to cube to provide an appearance of being individually and randomly formed.

Figure 5:
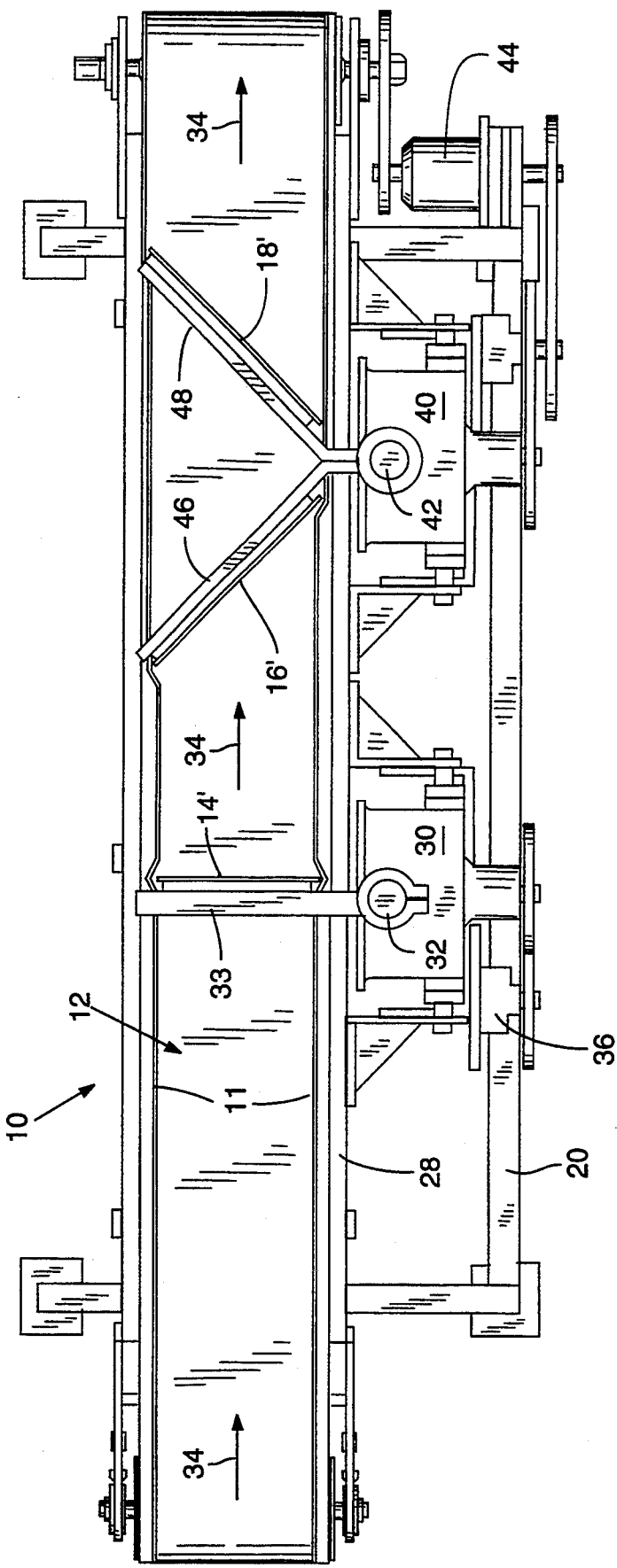
FIG. 5 is a view similar to FIG. 2 showing an alternate set of knives.

The knives 14, 16 and 18 illustrated in FIGS. 1-4 are shown to have a sinusoidal form on their cutting edges. It will be appreciated that the form of the cutting edges may also be straight such as the knives 14', 16' and 18' of FIG. 5 or have a form other than that illustrated in the drawings. Also, the three knives do not have to have the same form. The knives may be mixed or matched as desired. For example, a straight knife 14' may be provided on arm 33 with sinusoidal knives 16, 18 provided on arms 46, 48. Generally the appearance and shape desired in the end product will determine what type of knife will be utilized on the arms 33, 46 and 48.

Figure 6A:
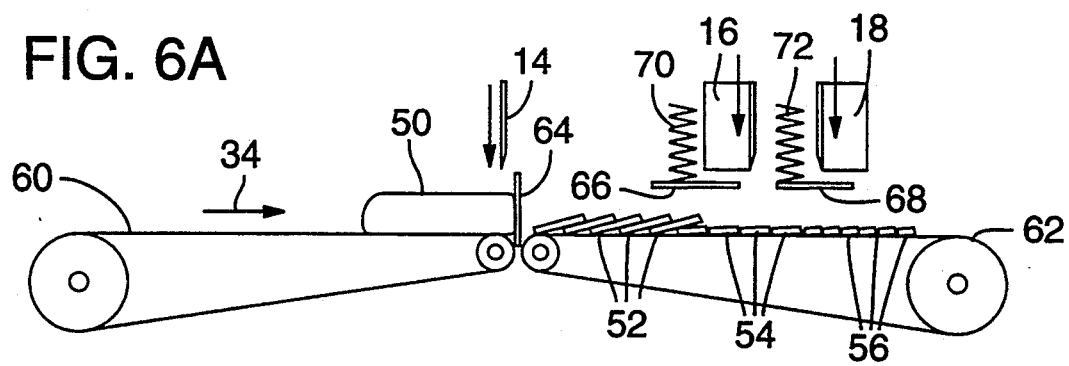
FIGS. 6A, 6B and 6C are schematic illustrations of other embodiments of the three dimensional slicing/dicing machine of the present invention.
Figure 6B:
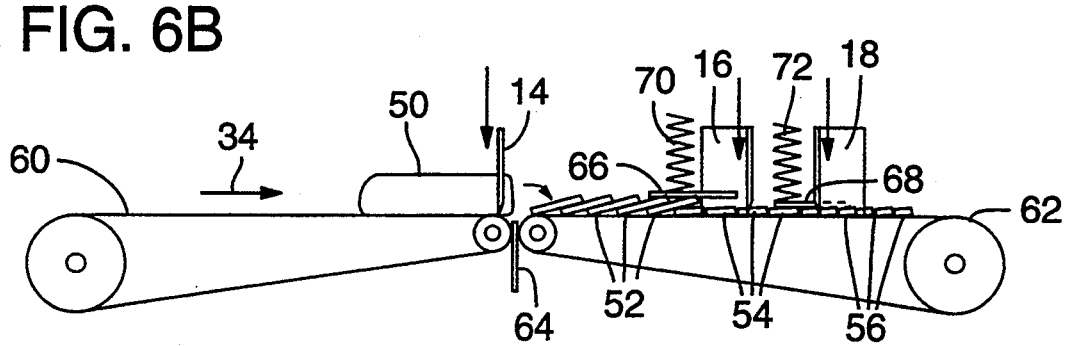
Figure 6C:
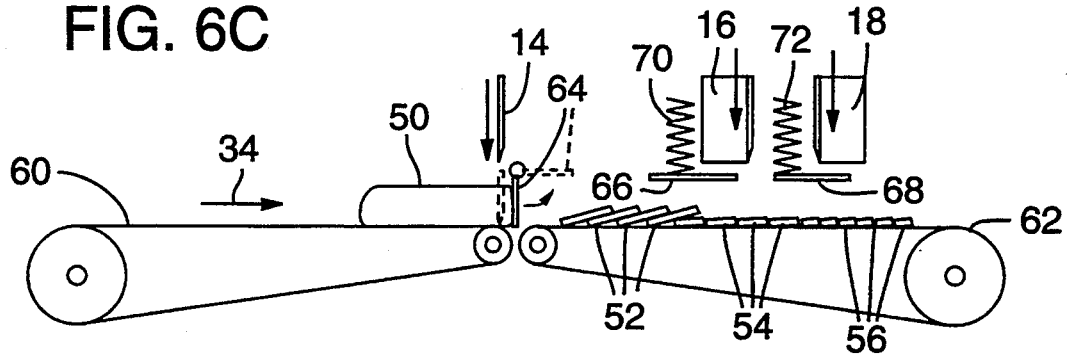

Those skilled in the art will recognize that modifications and variations may be made without departing from the true spirit and scope of the invention. The conveyor system of the machine 10 may for example have two conveyors as schematically illustrated in FIGS. 6A, 6B and 6C. Conveyor 60 conveys the loaf 50 to the slicing station of the knife 14 and conveyor 62 conveys the slice(s) 52 produced by the knife 14 to the slicing station of knife 16 and continues the conveyance of the strips 54 produced by knife 16 to the slicing station of the knife 18. The conveyor 60 feed rate thus may be adjusted independently of the conveyor 62. A stabilizing blade 64 may also be provided strategic to the knife 14. The blade 64 moves vertically with the knife 14 as illustrated in FIGS. 6A and 6B. When the knife 14 is in the elevated position, the blade 64 is also elevated and is positioned to limit the movement of the loaf 50 on the conveyor 60. As the knife 14 descends to cut a slice 52 off the loaf 50, the blade 64 travels downward between the ends of the conveyors 60 and 62 allowing the slice 52 to tip over on the conveyor 62 by gravity. As the knife 14 elevates, the blade 64 will also elevate to engage the end of the loaf 50 as the loaf is transported on the conveyor 60 in the direction indicated by arrow 34. The spacing between the knife 14 and the blade 64 is adjustable to accommodate producing different widths of slices 52.

The blade 64 may also be pivotally mounted as schematically indicated in FIG. 6C. This arrangement may then be utilized on either the single conveyor or double conveyor configuration. The blade 64 is arranged to pivot out of the way as the knife 14 descends to cut a slice 52 off the loaf 50.

Another modification is the provision of hold down baffles 66, 68 that are provided for the knives 16, 18. The baffle 66 provided in conjunction with knife 16 is arranged to descend with the knife 16 to hold the slices 52 produced by the knife 14 in position as the knife 16 cuts the slices 52 into strips 54. Similarly the baffle 68 provided for knife 18 will descend with the knife 18 to hold the strips 54 produced by the knife 16 in position as the knife 18 cuts the strips 54 into cube like formations 56. The baffles 66, 68 for the knives 16, 18 incorporate yieldable biasing members 70, 72, such as springs, to accommodate variations in the height that the slices 52, strips 54 extend above the conveyor. The baffles 66, 68 are arranged to travel with the knives 16, 18 in their flying cutoff pattern.

The invention is therefore not to be limited to the embodiments described and illustrated, but is to be determined from the appended claims.

What is claimed is:

1. A dicing machine for slicing food product into irregular cubes, comprising:

a conveyor for conveying horizontally laid slices of food product downstream along a substantially longitudinal path of movement, said path of movement having sides between which the food product is maintained;

a first vertically oriented blade overlying the path of movement including mechanism for vertically moving the blade in a reciprocating motion for slicing down through the slices of food product on the conveyor to form strips of food product, said first blade having a cutting edge that is angled relative to the path of movement and extends from one of the opposed sides downstream to the other of the two opposed sides whereby the strips are similarly angled while being conveyed downstream along the path of movement beyond said first blade;

a second vertically oriented blade overlying the food product path of movement at a point downstream from the first blade and including mechanism for vertically moving the blade in a reciprocating motion for slicing down through the strips of food product, said second blade having a cutting edge that is angled relative to the path of movement and extends from said other of the opposed sides downstream to the first of the opposed sides; and said first blade edge being sinusoidal in shape and said second blade edge being sinusoidal in shape, and said first and second blade edges cooperatively arranged and reciprocally actuated to create cube-like portions having four faces that are formed from varied sections of the sinusoidal shapes of the first and second blades to convey the appearance of irregularity.

2. A dicing machine as defined in claim 1 including a blade that precedes said first vertically oriented blade and including mechanism for vertically moving the blade in a reciprocating vertical motion, said blade having a cutting edge that is sinusoidal and said blade cutting edge oriented crossway to the path of movement for slicing a loaf of food product into slices having sinusoidal-shaped faces, and means for horizontally laying the slices onto the conveyor to be conveyed along the path of movement downstream toward the first blade.

3. A dicing machine as defined in claim 2 wherein the mechanism for reciprocally moving the first and second blades includes a longitudinal movement as the blades slice through the food product, said longitudinal movement matched to the speed of the conveyor.

4. A dicing machine as defined in claim 1 wherein the angle of the angled blades is about 45 degrees from the direction of the path of movement.

5. A dicing machine as defined in claim 2 wherein the slices are horizontally laid in shingled arrangement.

* * * * *